April 8, 1930.  E. A. DAVIS  1,753,264
SCREEN AND HANGER THEREFOR
Filed June 25, 1926
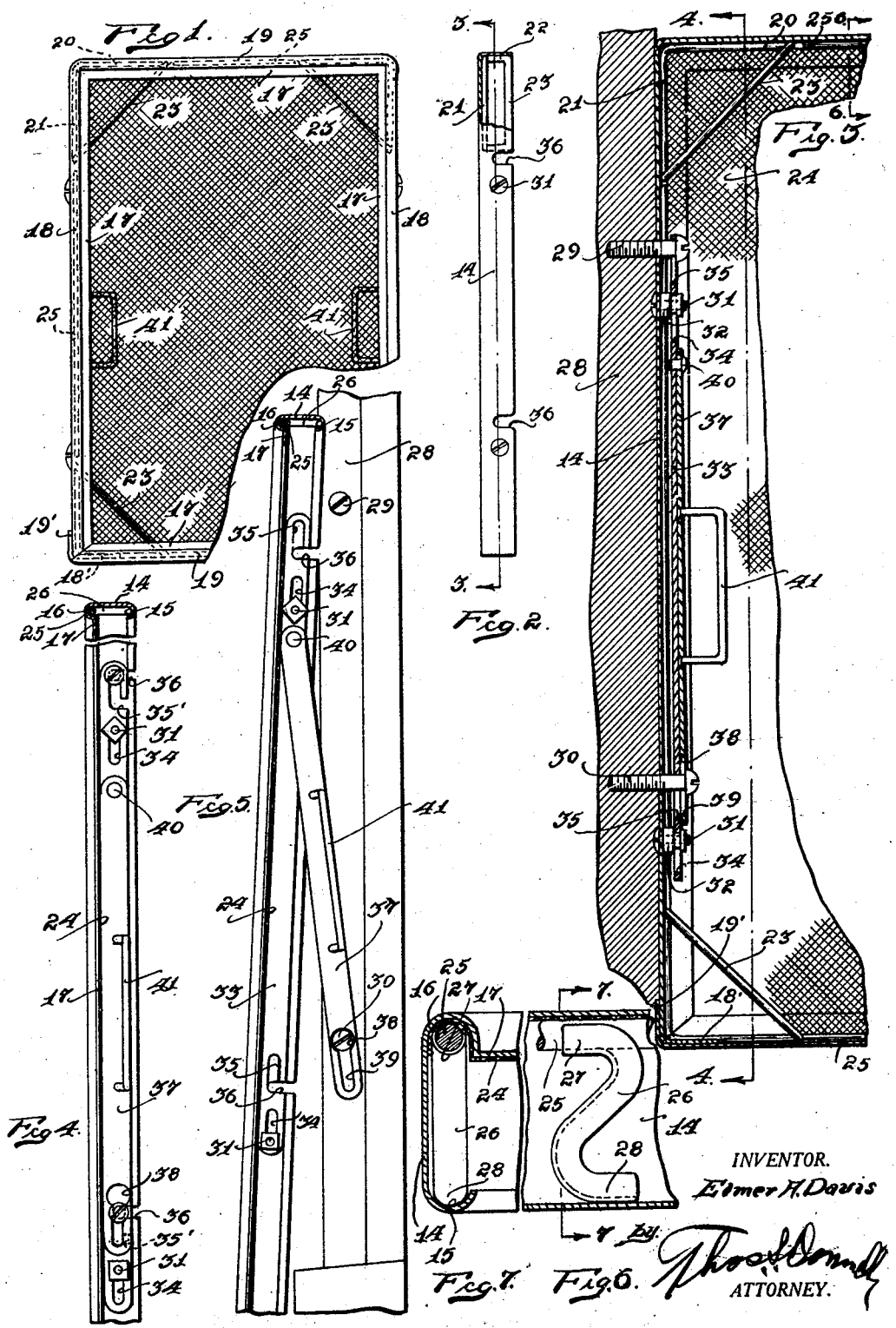
INVENTOR.
Elmer A. Davis
ATTORNEY.

Patented Apr. 8, 1930

1,753,264

UNITED STATES PATENT OFFICE

ELMER A. DAVIS, OF DETROIT, MICHIGAN

SCREEN AND HANGER THEREFOR

Application filed June 25, 1926. Serial No. 118,436.

My invention relates to a new and useful improvement in a screen frame and hanger therefor and has as its object the provision of a screen frame which will be simple in structure, economical of manufacture, and highly efficient in use.

Another object of the invention is the provision of a screen frame which may be constructed from metal, light and durable, and one which the screen may be easily and quickly attached and detached therefrom.

It is another object of the invention to provide a locking means whereby the screen may be securely locked in the frame and removable therefrom at will.

Another object of the invention is the provision of screen attaching means for holding the screen in place at the corners of the frame, so arranged and constructed as to be adapted for use with screen frames of various sizes.

Another object of the invention is the provision on the frame of a simple and easily operated hanging mechanism whereby the screen may be easily and quickly mounted in position on a window frame and easily and quickly removed therefrom.

Another object of the invention is the provision in a screen frame hanging mechanism of this class of a structure permitting the screen to be swung on a pivot when mounted on the window frame.

Another object of the invention is the provision of a compact hanging mechanism which is permanently attached to the screen frame.

Other objects will appear hereinafter.

The invention consists in the combination and arrangement of parts hereinafter described and claimed.

The invention will be best understood by a reference to the accompanying drawings which form a part of this specification and in which, Fig. 1 is a fragmentary front elevational view of a screen and frame embodying the invention.

Fig. 2 is a side elevational view of the frame.

Fig. 3 is a fragmentary sectional view taken on substantially line 3—3 of Fig. 2, showing the screen frame attached to a window frame.

Fig. 4 is a fragmentary sectional view taken on substantially line 4—4 of Fig. 3.

Fig. 5 is a fragmentary view similar to Fig. 4 showing the method of attaching the screen frame to a window frame.

Fig. 6 is a fragmentary sectional view taken on substantially line 6—6 of Fig. 3.

Fig. 7 is a fragmentary sectional view taken on substantially line 7—7 of Fig. 6.

In the invention the screen frame is preferably formed from metal as an economical structure may be fabricated from this material, and a light and durable frame provided.

The fame proper is made from metal which has the main body portion 14 curled at its opposite edges to form the channels 15 and 16, an inwardly projecting flange 17 extending inwardly from the channel 16. This main body 14 is bent into the form shown in Fig. 1 to provide for rails 19 and side rails 18, a portion of the flange 17 being cut away to provide a triangular cut and form the meeting edges. An extension 18' is provided on the side rail 18 and an extension 19' on the end rail 19, which overlap and are secured together by welding or in any other suitable manner.

For securing the screen 24 in the frame at the corners I have provided a triangular shaped wire member adapted for seating in the channel 16, this wire member having the legs 20 and 21, projecting upwardly from the end of each of which is an upright 22, the wire 23 connecting these uprights. This piece may be formed singly or the adjoining ends of the wire may be left open as desired. By forming this corner holding member in this manner an economical structure is provided in that the corner holding members may be used with frames of various sizes and it is but necessary to secure in the channel 16 between the corners strips of wire 25. To retain these holding members in position and to retain the wire members 25 in engagement with the screen 24, the edges of which are positioned in the channel 16, I have provided an S-shaped locking member 26, the end 27 being formed concave as clearly appears in Fig. 7 and the end 28 being formed solid if desired, this end 28 preferably having a cylindrical outer surface for engaging the channel 15. After the screen edges have been placed in the channel 16 and the legs 20 and 21 engaged against the spring in these channels and the wire strips 25 also engaged against the spring in the channel 17 the concave end 27 of the S-shaped locking member 26 may be engaged against the wire strip 25 and the legs 20 and 21, a plurality of these S-shaped locking members 26 being used. The end 28 may then be moved downwardly so as to press the legs 20 and 21 tightly into engagement with the screen 24 and to press the wire strips 25 tightly into engagement with the screen 24, this S-shaped member 26 being rocked on its end 27 until the end 28 is at center, the locking through the means of the S-shaped member 26 being a cam operation. In this manner the screen is securely fastened to the metal frame in such a manner that it may be readily removed and replaced when necessary. I have provided a mechanism for hanging the screen frame on a window frame 28, this hanging mechanism being especially adapted for a metal frame of this class. Threaded into the window frame 28 so that the head thereof is spaced outwardly from the inner surface of the window frame 28 as shown in Fig. 3 are screws 29 and 30. Secured to the side rails 18 of the window frame at the main body 14 thereof by means of screws 31 is a bar 33 which is spaced from the inner surface of the main body 14 by means of the spacers 32. Formed in the bar 33 adjacent its opposite ends are longitudinally extending slots 34 which accommodate the slots 31 so that the bar 33 is longitudinally slidable of the main body 14 of the side rail on which it is mounted within the limits of the slots 34. Formed in the bar 33 upwardly of the slots 34 are longitudinally extending slots 35, each of which, as is clearly shown in Fig. 4, connects with a slot 35, which extends transversely of the bar 33 and outwardly to one edge thereof. Formed in the side rail and extending outwardly from the center thereof are slots 36. Swingably connected at one end to the bar 33 adjacent one end thereof by means of the rivet or bolt 40 is a supporting link 37 having a longitudinally extending slot 39 formed adjacent its opposite end and communicating with an enlarged head 38. Mounted on the supporting link 37 is a hand hold 41. This hanging mechanism which has been described embodying the bar 33 and the supporting link 37 is, of course, mounted on the inner surface of each of the side rails of the frame, a description of one side only being given.

It will be noted that when the bar 33 is moved upwardly on the rail so that the bolts 31 are at the lower end of the slots 34 that the slot 35' is in registration with the slot 36.

In mounting the screen frame on the window frame the bar 33 is moved into the position shown in Fig. 5 so that the bolts 31 engage the lower end of the slots 34, thus bringing the slots 36 into registration with the slots 35'. The supporting link 37 is then swung outwardly as shown in Fig. 5 and the head of the screw 30 is projected through the enlarged opening 38. By means of the hand holds 31 the screen frame is then raised upwardly so that the screw 30 moves downwardly into the slot 39, the head of the screw 30 preventing removal of the supporting link 37 from the window frame 28. The screen frame is then carried upwardly until the slots 36 and 35' which are in registration with each other register with the screw 29, at which time the frame is then moved bodily inwardly so that the screw 29 will engage in the slot 36 formed adjacent the upper end of the rail and the screw 30 will move into the slot 36 formed adjacent the lower end of the frame rail. When this engagement is had by means of the hand holds 41 the bar 33 is then moved downwardly on the screen frame so that the screws 29 and 30 are engaged in the slots 35, thus locking the screen frame on the window frame.

It will be noted from Fig. 4 that when this movement is effected that the enlarged opening 38 is positioned above the screw 30 as the downward movement is not sufficient to bring this enlarged opening 38 into registration with the screw 30, so that an undue removal of the screen frame from the window is prevented.

It is believed evident that the supporting link 37 will afford a means for swinging the screen frame outwardly from the window frame when desired.

While I have illustrated and described the preferred form of structure, I do not wish to limit myself to the preferred form of structure shown, but desire to avail myself of such variations and modifications as may come within the scope of the appended claims.

Having thus described my invention what I claim as new and desire to secure by Letters Patent is:

1. In a screen frame having a channel formed in its side and end rails communicating at its corners and adapted for the reception of a screen folded therein: a locking member comprising a pair of engaging legs extending at right angles to each other and adapted for lying in said meeting channels, an outwardly projected portion on each of said legs, and a cross member for connecting said outwardly projecting portions.

2. In a screen frame of the class described comprising side and end rails having channels formed at their opposite edges, one of said channels being adapted for the reception of a screen edge folded therein: a locking member for lying in said channel in engagement with said screen, a locking member adapted for engaging at one end said screen engaging locking member, and at the opposite end for lying in the opposite channel for preventing removal of said screen engaging locking member from operative position.

3. In a screen frame of the class described comprising side and end rails having a transversely extending slot formed in the edge of a pair of opposite rails: a bar slidably mounted on each of said rails, an operating link swingably connected at one end to said bar and provided at its opposite end with a longitudinally extending slot terminating at one end in an enlarged opening, a pair of head bearing supporting members adapted for mounting in a window frame in spaced relation, said enlarged opening in said operating link permitting the entry of said head therethrough and said elongated slot in said operating link preventing the passage of said head therethrough, said bar having an elongated slot adjacent each and communicating with a transversely extending slot, said transversely extending slot registering with the transversely extending slot in said rail upon movement of said bar a predetermined distance in one direction, said transversely extending slots being adapted for the reception of said supporting members, said longitudinally extending slots in said bar being adapted for the reception, upon movement of said bar in one direction, of said head bearing supporting members for locking said frame on said supporting members.

4. In a screen frame of the class described adapted for mounting on a window frame: a bar slidably mounted on opposite rails of said screen frame, said bar having adjacent its opposite ends a transversely extending slot communicating with a longitudinally extending slot, said rail having transversely extending slots adapted for registering with the transversely extending slot in said bar upon movement of said bar relatively to said frame a predetermined distance in one direction, a pair of supporting members adapted for mounting in said window frame in spaced relation, said transversely extending slots being adapted for the reception of said supporting members; and means for moving said bar in the opposite direction relatively to said rails for engaging said supporting members in said longitudinally extending slots for locking said screen frame on said window frame.

In testimony whereof I have signed the foregoing.

ELMER A. DAVIS.